US012725807B2

(12) United States Patent
Miyata et al.

(10) Patent No.: US 12,725,807 B2
(45) Date of Patent: Sep. 1, 2026

(54) ELECTRODE CATALYST, ELECTRODE CATALYST LAYER USING ELECTRODE CATALYST, MEMBRANE-ELECTRODE ASSEMBLY, AND ELECTROCHEMICAL DEVICE

(71) Applicant: Panasonic Intellectual Property Management Co., Ltd., Osaka (JP)

(72) Inventors: Nobuhiro Miyata, Osaka (JP); Haruhiko Shintani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 477 days.

(21) Appl. No.: 18/453,346

(22) Filed: Aug. 22, 2023

(65) Prior Publication Data

US 2023/0395819 A1 Dec. 7, 2023

Related U.S. Application Data

(63) Continuation of application No. PCT/JP2022/009584, filed on Mar. 7, 2022.

(30) Foreign Application Priority Data

Mar. 19, 2021 (JP) ................................ 2021-046251
Feb. 8, 2022 (JP) ................................ 2022-017861

(51) Int. Cl.
*H01M 8/22* (2006.01)
*H01M 4/92* (2006.01)
*H01M 12/06* (2006.01)

(52) U.S. Cl.
CPC ........... *H01M 4/926* (2013.01); *H01M 12/06* (2013.01); *H01M 2300/0082* (2013.01)

(58) Field of Classification Search
CPC ...... H01M 4/926; H01M 4/925; H01M 4/921; H01M 4/92; H01M 4/928; H01M 4/9075; H01M 12/06; H01M 12/04; H01M 2300/0082
See application file for complete search history.

(56) References Cited

U.S. PATENT DOCUMENTS

| | | | | |
|---|---|---|---|---|
| 10,790,526 | B2 | 9/2020 | Shintani et al. | |
| 2011/0143254 | A1* | 6/2011 | Kongkanand ......... | H01M 4/921 429/523 |
| 2015/0333338 | A1* | 11/2015 | Hayden ................ | H01M 4/921 423/598 |
| 2016/0064744 | A1 | 3/2016 | Mashio et al. | |
| 2017/0200956 | A1 | 7/2017 | Nagami et al. | |
| 2019/0336956 | A1 | 11/2019 | Suzue et al. | |
| 2020/0176786 | A1* | 6/2020 | Ishida ................ | H01M 4/8892 |

FOREIGN PATENT DOCUMENTS

| | | |
|---|---|---|
| JP | 2017-123312 | 7/2017 |
| WO | 2017/183475 | 10/2017 |

OTHER PUBLICATIONS

English Translation of Chinese Search Report dated Mar. 11, 2026 for the related Chinese Patent Application No. 202280020860.4.
The EPC Office Action dated Oct. 7, 2024 for the related European Patent Application No. 22771158.7.
Junrui Li et al: “Fe Stabilization by Intermetallic L1 0-FePt and Pt Catalysis Enhancement in L1 O—FePt/Pt Nanoparticles for Efficient Oxygen Reduction Reaction in Fuel Cells”, Journal of the American Chemical Society, vol. 140, No. 8, Feb. 15, 2018 (Feb. 15, 2018), pp. 2926-2932, XP055701149.
International Search Report of PCT application No. PCT/JP2022/009584 dated May 10, 2022.

* cited by examiner

*Primary Examiner* — Raymond Alejandro
(74) *Attorney, Agent, or Firm* — Rimon P.C.

(57) ABSTRACT

An electrode catalyst according to the present disclosure includes a mesoporous material and catalyst metal particles which are supported in at least an inner portion of the mesoporous material and which contain platinum and a metal different from platinum. The mesoporous material has mesopores having a mode radius of greater than or equal to 1 nm and less than or equal to 25 nm and a pore volume of greater than or equal to 1.0 $cm^3/g$ and less than or equal to 3.0 $cm^3/g$. The catalyst metal particles which are supported have an $L1_0$ structure. The proportion of the $L1_0$ structure is greater than 0.25.

10 Claims, 4 Drawing Sheets

FIG. 1
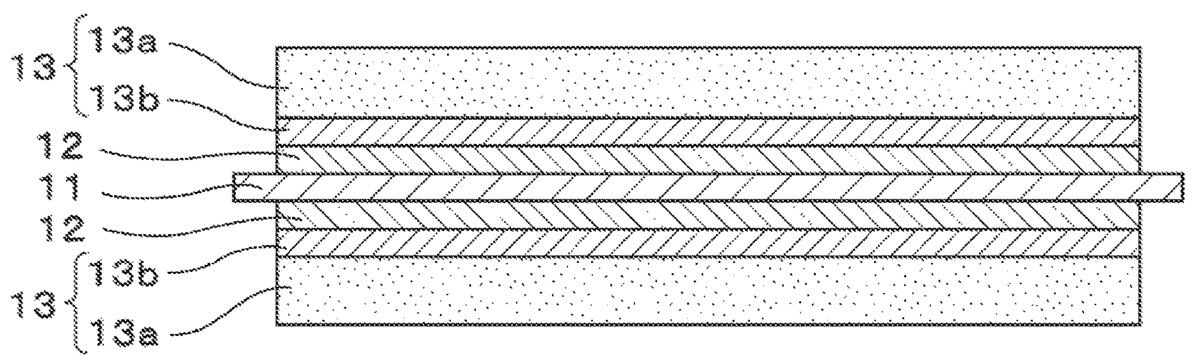
FIG. 2
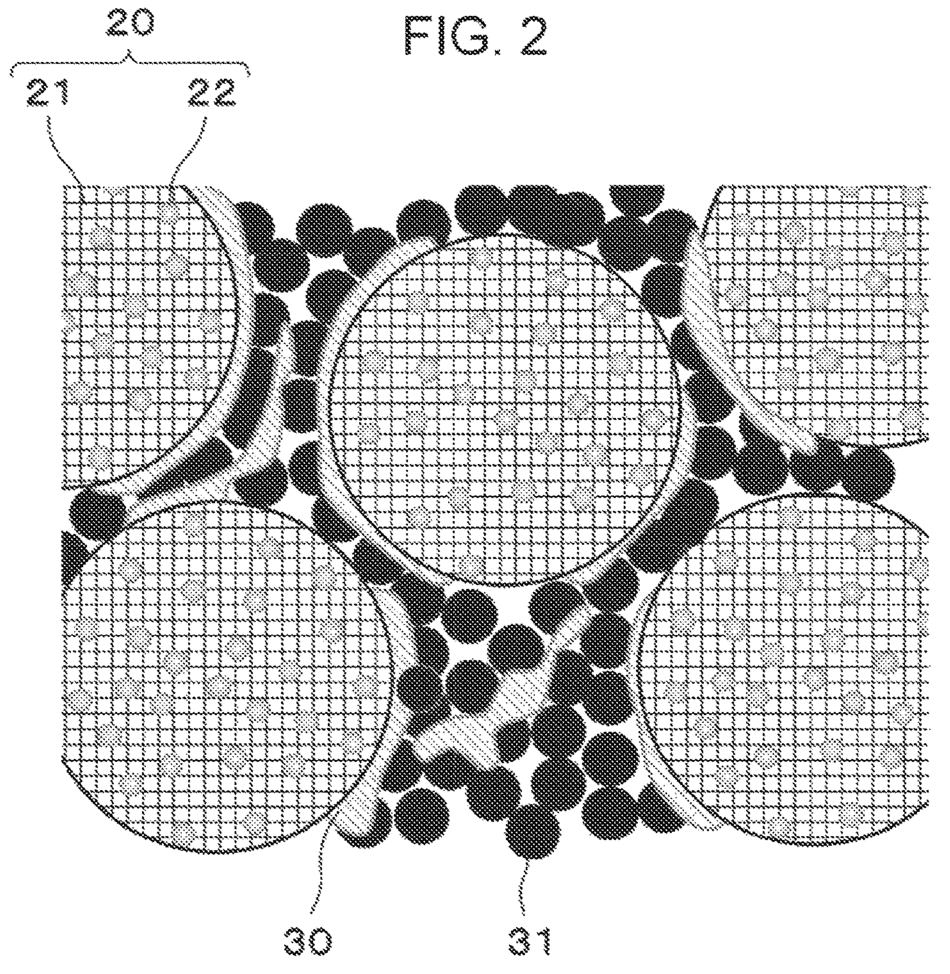

ELECTRODE CATALYST, ELECTRODE CATALYST LAYER USING ELECTRODE CATALYST, MEMBRANE-ELECTRODE ASSEMBLY, AND ELECTROCHEMICAL DEVICE

BACKGROUND

1. Technical Field

The present disclosure relates to an electrode catalyst, an electrode catalyst layer containing the electrode catalyst, a membrane-electrode assembly including the electrode catalyst layer, and an electrochemical device using the membrane-electrode assembly.

2. Description of the Related Art

A fuel cell is known as an example of an electrochemical device. For example, a solid polymer fuel cell includes a membrane-electrode assembly for subjecting a fuel gas containing hydrogen and an oxidant gas containing oxygen to an electrochemical reaction (power generation reaction).

In general, an electrode catalyst layer included in a membrane-electrode assembly is formed in such a manner that a catalyst paste is prepared by dispersing a catalyst, including a catalyst metal such as platinum and an electrically conductive material such as carbon black on which catalyst metal is supported, and a polymer electrolyte (hereinafter an ionomer) having proton conductivity in a solvent such as water or alcohol, is applied to a polymer electrolyte membrane or another substrate, and is dried.

The microstructure (hereinafter, a three-phase interface structure) of a catalyst layer prepared in this manner is a structure in which a catalyst is covered by an ionomer. In the three-phase interface structure, it has been conceived that contacting a catalyst metal with the ionomer leads to the enhancement of performance from the viewpoint of supplying protons to a surface of the catalyst metal. However, in recent years, it has been pointed out that a catalyst metal contacted with an ionomer is poisoned by the ionomer and is reduced in catalytic performance.

For a problem with such a decrease in catalytic performance, the following method has been proposed: a method in which particles of a catalyst metal are supported in inner portions of a support such as mesoporous carbon and an ionomer is formed so as to cover the support in which the particles are supported for the purpose of suppressing the poisoning of the catalyst metal by the ionomer (see, for example, Japanese Patent No. 6628867).

In addition, there is a report that catalytic activity is further enhanced by ordering the structure of an alloy catalyst. In general, when a catalyst is an alloy of platinum and a metal other than platinum, the crystal structure of the alloy is an irregular structure in which a second metal is randomly present in platinum in the form of a solid solution, whereas, there is a report that forming an $L1_2$ structure which is one of ordered structures enhances catalytic activity (see, for example, Japanese Patent Nos. 6628867 and 6352955).

SUMMARY

However, in catalysts disclosed in Japanese Patent No. 6628867 or 6352955, a catalyst having high catalytic activity has not been sufficiently investigated.

One non-limiting and exemplary embodiment provides an electrode catalyst enhancing the catalytic activity of a catalyst metal supported in a mesoporous material support more than that in the related art.

In one general aspect, the techniques disclosed here feature an electrode catalyst including a mesoporous material and catalyst metal particles which are supported in at least an inner portion of the mesoporous material and which contain platinum and a metal different from platinum for the purpose of solving the above problem. The mesoporous material has mesopores having a mode radius of greater than or equal to 1 nm and less than or equal to 25 nm and a pore volume of greater than or equal to 1.0 $cm^3/g$ and less than or equal to 3.0 $cm^3/g$. The catalyst metal particles which are supported have an $L1_0$ structure and the proportion of the $L1_0$ structure is greater than 0.25.

The present disclosure is configured as described above and provides an effect that catalytic activity higher than that in the related art is obtained.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a schematic view showing an example of the schematic configuration of a membrane-electrode assembly included in an electrochemical device according to an embodiment of the present disclosure;

FIG. 2 is a schematic view showing the schematic configuration of electrode catalyst layers included in the membrane-electrode assembly shown in FIG. 1;

DETAILED DESCRIPTIONS

Figure 3:
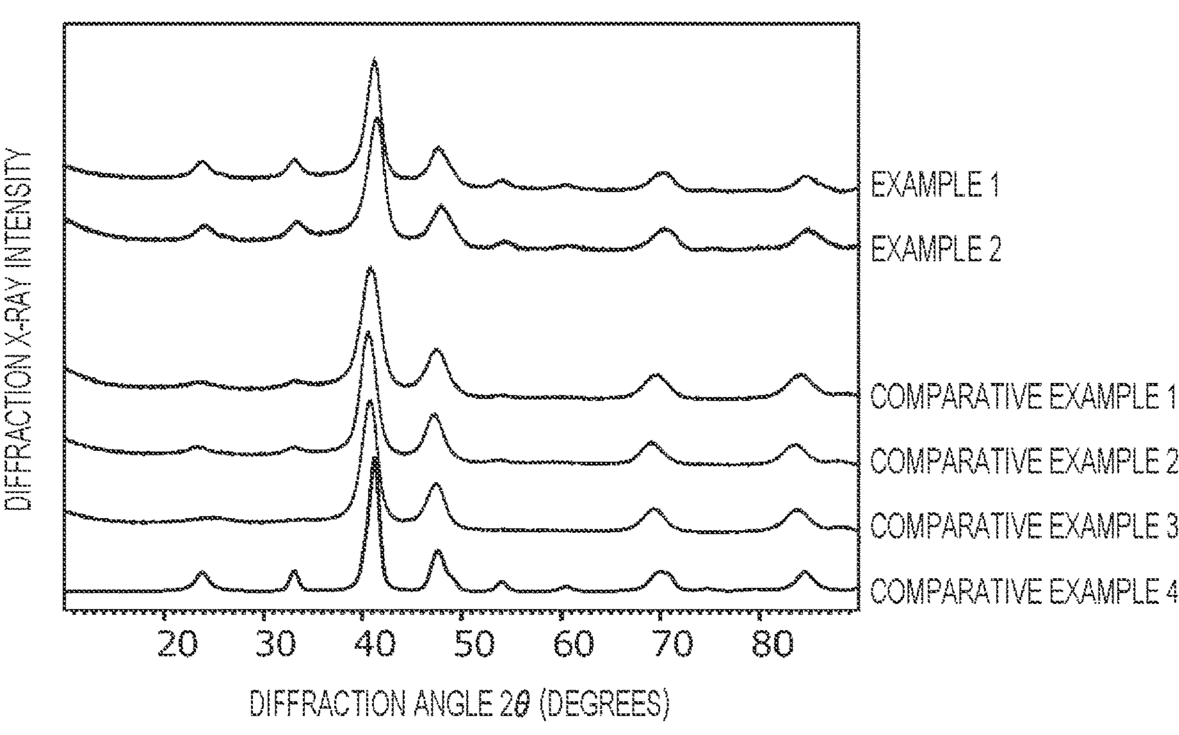
FIG. 3 is a graph showing X-ray diffraction (XRD) patterns of electrode catalysts according to Examples 1 and 2 of the present disclosure and Comparative Examples 1 to 4.

Underlying Knowledge Forming Basis of Aspects of the Present Disclosure

The inventors have intensively investigated insufficient catalytic activity in catalysts described in Japanese Patent No. 6628867 or 6352955. As a result, the inventors have focused on an ordered alloy phase of a catalyst metal supported in a mesoporous material. The inventors have thereby found the enhancement of catalytic activity due to a fact that catalyst metal particles supported in the mesoporous material have an $L1_0$ structure and the proportion of the $L1_0$ structure is greater than 0.25.

The finding by the inventors is one that has not yet been clarified and has a novel technical feature that provides a significant advantageous effect. The present disclosure specifically provides aspects below.

An electrode catalyst according to a first aspect of the present disclosure is an electrode catalyst containing a mesoporous material and catalyst metal particles which are supported in at least an inner portion of the mesoporous material and which contain platinum and a metal different from platinum. The mesoporous material may have mesopores having a mode radius of 1 nm to 25 nm and a pore volume of 1.0 $cm^3/g$ to 3.0 $cm^3/g$. The supported catalyst metal particles may have an $L1_0$ structure and the proportion of the $L1_0$ structure may be greater than 0.25.

According to this configuration, the proportion of catalyst particles having high catalytic activity and the $L1_0$ structure among all the catalyst metal particles is greater than 0.25 and therefore the catalytic activity of the catalyst metal particles can be enhanced more than that in the related art.

Furthermore, since the electrode catalyst contains the catalyst metal particles in the mesoporous material, even in a case where a catalyst layer is formed using an ionomer, the contact of the catalyst metal particles with the ionomer can be reduced.

Thus, the electrode catalyst according to the first aspect of the present disclosure provides an effect that high catalytic activity can be obtained. In a case where, for example, a fuel cell is prepared using the electrode catalyst, the fuel cell can have high power generation performance.

In the first aspect, the electrode catalyst according to a second aspect of the present disclosure is such that the proportion of the $L1_0$ structure in the catalyst metal particles is greater than or equal to 0.60.

In the first or second aspect, the electrode catalyst according to a third aspect of the present disclosure is such that the metal different from platinum may be cobalt.

According to this configuration, the catalyst metal particles can be made from an alloy which has excellent catalytic activity and durability and which contains platinum and cobalt.

In any one of the first to third aspects, the electrode catalyst according to a fourth aspect of the present disclosure is such that the mode radius of the mesopores may be greater than or equal to 3 nm and less than or equal to 6 nm.

According to this configuration, the size of the mesopores is sufficiently small as compared to a case where the mode radius of the mesopores is greater than or equal to 6 nm. Therefore, reducing the ingress of an ionomer into pores of the mesoporous material enables a reaction gas to be efficiently supplied to the catalyst metal particles inside the mesoporous material. The size of the mesopores is sufficiently large as compared to a case where the mode radius of the mesopores is less than or equal to 3 nm. Therefore, the catalyst metal particles can be supported in the mesopores. As a result, the poisoning of a catalyst metal by the ionomer is reduced, thereby enabling the reduction of catalytic activity to be suppressed.

In any one of the first to fourth aspects, the electrode catalyst according to a fifth aspect of the present disclosure is such that the mesoporous material may be mesoporous carbon.

According to this configuration, the mesoporous material is mesoporous carbon and therefore the electrode catalyst can have excellent electrical conductivity and water repellency. In a case where, for example, a fuel cell is prepared using the electrode catalyst, the fuel cell can have high power generation performance.

An electrode catalyst layer according to a sixth aspect of the present disclosure is an electrode catalyst layer containing a mesoporous material and catalyst metal particles which are supported in at least an inner portion of the mesoporous material and which contain platinum and a metal different from platinum. The mesoporous material has mesopores having a mode radius of 1 nm to 25 nm and a pore volume of 1.0 $cm^3/g$ to 3.0 $cm^3/g$. The supported catalyst metal particles contain an electrode catalyst which has an $L1_0$ structure and in which the proportion of the $L1_0$ structure is greater than 0.25 and an ionomer.

According to this configuration, the electrode catalyst layer can use high proton conductivity that the ionomer has. Furthermore, the electrode catalyst layer can suppress the reduction of activity due to the contact of the catalyst metal particles with the ionomer. Thus, the electrode catalyst layer according to the sixth aspect of the present disclosure provides an effect that an electrode catalyst layer with high activity can be obtained. In a case where, for example, a fuel cell is prepared using the electrode catalyst layer, the fuel cell can have high power generation performance.

In the sixth aspect, the electrode catalyst layer according to a seventh aspect of the present disclosure may contain at least one of carbon black or carbon nanotubes.

Herein, carbon particles that form carbon black and carbon nanotubes have an average particle size in the range of 10 nm to 100 nm and are fine. Therefore, an electrode catalyst layer containing the carbon particles can have high drainage performance due to capillary force. On the other hand, an electrode catalyst layer made of the mesoporous material only has a problem with drainage performance in some cases.

According to this configuration, the electrode catalyst layer contains at least one of the carbon black or the carbon nanotubes and therefore can have increased drainage performance as compared to an electrode catalyst layer made of the mesoporous material only. In a case where, for example, a fuel cell is prepared using the electrode catalyst layer, the fuel cell can have high power generation performance.

In the seventh aspect, the electrode catalyst layer according to an eighth aspect of the present disclosure is such that the carbon black may be Ketjenblack.

According to this configuration, the carbon black contained in the electrode catalyst layer is Ketjenblack and therefore the electrode catalyst layer can have excellent electrical conductivity and drainage performance. In a case where, for example, a fuel cell is prepared using the electrode catalyst layer, the fuel cell can have high power generation performance.

A membrane-electrode assembly according to a ninth aspect of the present disclosure includes a polymer electrolyte membrane, a fuel electrode disposed on a principal surface of the polymer electrolyte membrane, and an air electrode disposed on another principal surface of the polymer electrolyte membrane. The air electrode is an electrode catalyst containing a mesoporous material and catalyst metal particles which are supported in at least an inner portion of the mesoporous material and which contain platinum and a metal different from platinum. The mesoporous material has mesopores having a mode radius of 1 nm to 25 nm and a pore volume of 1.0 $cm^3/g$ to 3.0 $cm^3/g$. The supported catalyst metal particles include an electrode catalyst layer containing a catalyst which has an $L1_0$ structure and in which the proportion of the $L1_0$ structure is greater than 0.25 and an ionomer.

According to this configuration, the electrode catalyst layer, which is included in the air electrode of the membrane-electrode assembly, can use high proton conductivity that the ionomer has. Furthermore, the electrode catalyst layer can suppress the reduction of activity due to the contact of the catalyst metal particles with the ionomer. Thus, the membrane-electrode assembly can have high catalytic activity.

Therefore, in a case where, for example, a fuel cell is prepared using the membrane-electrode assembly, the fuel cell can have high power generation performance.

An electrochemical device according to a tenth aspect of the present disclosure includes a polymer electrolyte membrane, a fuel electrode disposed on a principal surface of the polymer electrolyte membrane, and an air electrode disposed on another principal surface of the polymer electrolyte membrane. The air electrode is an electrode catalyst containing a mesoporous material and catalyst metal particles which are supported in at least an inner portion of the mesoporous material and which contain platinum and a metal different from platinum. The mesoporous material has mesopores having a mode radius of 1 nm to 25 nm and a pore volume of 1.0 $cm^3/g$ to 3.0 $cm^3/g$. The supported catalyst metal particles include a membrane-electrode assembly including an electrode catalyst layer containing an electrode catalyst which has an $L1_0$ structure and in which the proportion of the $L1_0$ structure is greater than 0.25 and an ionomer.

According to this configuration, the electrode catalyst layer, which is included in the air electrode of the membrane-electrode assembly, can use high proton conductivity that the ionomer has. Furthermore, the electrode catalyst layer can suppress the reduction of activity due to the contact of the catalyst metal particles with the ionomer. Thus, the electrochemical device, which includes the membrane-electrode assembly, can have high catalytic activity. Therefore, when the electrochemical device according to the tenth aspect of the present disclosure is, for example, a fuel cell, the fuel cell can have high power generation performance.

Embodiments of the present disclosure are described below with reference to drawings. Hereinafter, the same or corresponding constituent members are given the same reference numerals throughout all the drawings and are not described in detail in some cases.

Embodiments

An electrochemical device according to an embodiment of the present disclosure is described. The electrochemical device according to an embodiment of the present disclosure is described using a fuel cell as an example. The electrochemical device is not limited to the fuel cell and may be, for example, a water electrolyzer that electrolyzes water for the purpose of producing hydrogen and oxygen.

Membrane-Electrode Assembly

First, the configuration of a membrane-electrode assembly 10 included in the electrochemical device according to the present disclosure is described with reference to FIG. 1. FIG. 1 is a schematic view showing an example of the schematic configuration of the membrane-electrode assembly 10 included in the electrochemical device according to an embodiment of the present disclosure. As shown in FIG. 1, the membrane-electrode assembly 10 includes a polymer electrolyte membrane 11, a fuel electrode (anode), and an air electrode (cathode), the fuel electrode and air electrode including electrode catalyst layers 12 and gas diffusion layers 13, and has a configuration in which both sides of the polymer electrolyte membrane 11 are interposed between the fuel electrode and the air electrode. That is, as shown in FIG. 1, the electrode catalyst layers 12 constituting a pair are disposed on respective sides of the polymer electrolyte membrane 11 and a pair of the gas diffusion layers 13 are disposed so as to sandwich a pair of the electrode catalyst layers 12.

Polymer Electrolyte Membrane

The polymer electrolyte membrane 11 is one that performs ion (proton) conduction between the air electrode and the fuel electrode and needs to have both proton conductivity and gas barrier properties. For example, an ion-exchange fluororesin membrane or an ion-exchange hydrocarbon resin membrane is given as an example of the polymer electrolyte membrane 11. In particular, a perfluorosulfonic acid resin membrane has high proton conductivity, is stably present in, for example, an environment in which a fuel cell generates electricity, and is therefore appropriate. It is appropriate that the ion-exchange capacity of an ion-exchange resin is greater than or equal to 0.9 milliequivalents/g-dry resin and less than or equal to 2.0 milliequivalents/g-dry resin. When the ion-exchange capacity is greater than or equal to 0.9 milliequivalents/g-dry resin, high proton conductivity is likely to be obtained. When the ion-exchange capacity is less than or equal to 2.0 milliequivalents/g-dry resin, the swelling of resin due to water absorption is suppressed and the change in size of the polymer electrolyte membrane 11 is suppressed, which is therefore appropriate. It is appropriate that the thickness of the polymer electrolyte membrane 11 is greater than or equal to 5 μm and less than or equal to 50 μm. When the thickness is greater than or equal to 5 μm, high gas barrier properties are obtained. When the thickness is less than or equal to 50 μm, high proton conductivity is obtained.

Gas Diffusion Layers

The gas diffusion layers 13 are layers having current collection action, gas permeability, and water repellency and may have a configuration that includes two layers, a base material **13*a* and a coating sublayer 13*b*, as shown in FIG. 1. The base material 13*a* may be a material excellent in electrical conductivity, gas permeability, and liquid permeability. For example, porous materials such as carbon paper, carbon fiber cloth, and carbon fiber felt are given as examples of the base material 13*a*. The coating sublayer 13*b* is interposed between the base material 13*a* and the electrode catalyst layer 12 and is a layer for reducing the contact resistance thereof to enhance liquid permeability (water repellency). The coating sublayer 13*b*** is formed using, for example, an electrically conductive material such as carbon black and a water-repellent resin such as polytetrafluoroethylene (PTFE) as major components.

Electrode Catalyst Layers

The electrode catalyst layers 12 are layers that accelerate the rate of an electrochemical reaction on an electrode. The electrode catalyst layers 12 according to an embodiment of the present disclosure are described with reference to FIG. 2. FIG. 2 is a schematic view showing the schematic configuration of the electrode catalyst layers 12, which are included in the membrane-electrode assembly 10 shown in FIG. 1.

As shown in FIG. 2, the electrode catalyst layers 12 according to an embodiment of the present disclosure contain an electrode catalyst 20 and an ionomer 30 (proton-conductive resin). The electrode catalyst 20 contains a mesoporous material 21 and catalyst metal particles 22 which are supported in at least an inner portion of the mesoporous material 21 and which contain platinum and a metal different from platinum. The electrode catalyst 20 is an electrode catalyst for electrochemical cells. Thus, the electrode catalyst 20 can be used in, for example, fuel cells, electrochemical cells of water electrolyzers, and electrochemical cells of electrochemical compressors.

Furthermore, a water-repellent material 31 may be added to the electrode catalyst layers 12 according to an embodiment of the present disclosure for the purpose of enhancing drainage performance. The electrode catalyst layers 12 may contain, for example, at least one of carbon black or carbon nanotubes as the water-repellent material 31. The carbon black may be Ketjenblack.

For example, a method generally used for fuel cells can be used as a method for forming the electrode catalyst layers 12 according to an embodiment of the present disclosure. The electrode catalyst layers 12 can be formed in such a manner that, for example, the above-mentioned material is dispersed in a solvent containing water or alcohol, is applied to the polymer electrolyte membrane 11, the gas diffusion layers 13, and substrates such as various transfer films, and is dried.

The electrode catalyst layers 12, which have the above-mentioned configuration, can be used as electrode catalyst layers of an air electrode (cathode). The electrode catalyst layers 12 may be used as electrode catalyst layers of a fuel electrode (anode). Alternatively, an electrode catalyst layer of a fuel electrode may be configured similarly to conventional catalyst layers generally used in membrane-electrode assemblies of fuel cells. In the membrane-electrode assembly 10 according to an embodiment of the present disclosure, it is appropriate that the electrode catalyst layers 12, which have the above-mentioned configuration, are used as electrode catalyst layers of at least an air electrode.

In the membrane-electrode assembly 10 according to an embodiment of the present disclosure, in a case where an electrode catalyst layer of a fuel electrode is configured similarly to conventional catalyst layers, the electrode catalyst layer can be formed as described below. For example, platinum supported on carbon black or a platinum alloy catalyst and an ionomer are dispersed in a solvent containing water or alcohol, is applied to the polymer electrolyte membrane 11, the gas diffusion layers 13, and substrates such as various transfer films, and is dried.

Mesoporous Material

The mesoporous material 21, which is contained in the electrode catalyst 20 according to an embodiment of the present disclosure, is described below using mesoporous carbon as an example. The mesoporous material 21 is not limited to the mesoporous carbon. The mesoporous material 21 may be another material if this material has the same mode radius and the same pore volume. For example, an oxide of titanium, tin, niobium, tantalum, zirconium, aluminum, silicon, or the like is given as an example of the mesoporous material 21 other than the mesoporous carbon.

In the mesoporous material 21 according to an embodiment of the present disclosure, it is appropriate that the mode radius of mesopores is 1 nm to 25 nm and the pore volume of the mesopores is 1.0 $cm^3/g$ to 3.0 $cm^3/g$. It is preferable that the pore volume of the mesopores is greater than or equal to 1.0 $cm^3/g$ because a large number of the catalyst metal particles 22 can be supported in inner portions of the mesoporous material 21. It is appropriate that the pore volume of the mesopores is less than or equal to 3.0 $cm^3/g$ because the strength of the mesoporous material 21 as a structure is high. The phrase "the mode radius of mesopores is 1 nm to 25 nm and the pore volume of the mesopores is 1.0 $cm^3/g$ to 3.0 $cm^3/g$" indicates values that are satisfied in the mesopores of the mesoporous material 21 before the catalyst metal particles 22 are supported in the mesoporous material 21.

Furthermore, in the mesoporous material 21 according to an embodiment of the present disclosure, when the mode radius of the mesopores is greater than or equal to 3 nm, a reaction gas is likely to be supplied into the mesopores, which is preferable. When the mode radius of the mesopores is less than or equal to 6 nm, the ionomer 30 is unlikely to enter the mesopores.

Furthermore, the mesoporous material 21 according to an embodiment of the present disclosure may have an average particle size of greater than or equal to 200 nm. When the average particle size is greater than or equal to 200 nm, the proportion of the catalyst metal particles 22 that are affected by poisoning due to the ionomer 30 is small and catalytic activity can be enhanced. The average particle size of the mesoporous material 21 may be less than or equal to 1,000 nm. When the average particle size is less than or equal to 1,000 nm, a reaction gas is likely to be supplied to the catalyst metal particles 22 supported in inner portions of the mesoporous material 21.

The average particle size of the mesoporous material 21 may be measured using a laser diffraction particle size distribution analyzer or the like in such a state that the mesoporous material 21 is dispersed in a solvent or may be observed using a scanning electron microscope (SEM) or a transmission electron microscope (TEM). When the mesoporous material 21 is measured for particle size distribution in such a state that the mesoporous material 21 is dispersed in a solvent, it is necessary that particles of the mesoporous material 21 do not aggregate. Therefore, water, alcohol, or a mixed solvent of water and alcohol can be appropriately used as a solvent. It is appropriate that a dispersant is added to a solvent for the purpose of enhancing dispersibility. Examples of the dispersant include perfluorosulfonic acid resins, poly(oxyethylene)octyl phenyl ether, polyoxyethylenesorbitan monolaurate, and the like. Furthermore, it is appropriate that, after a solvent and the mesoporous material are mixed, a dispersion treatment is performed for the purpose of enhancing dispersibility. Examples of a dispersion treatment apparatus include ultrasonic homogenizers, wet jet mills, ball mills, mechanical stirring devices, and the like.

A method for producing the mesoporous material 21 according to an embodiment of the present disclosure is not particularly limited. For example, a method described in Japanese Unexamined Patent Application Publication No. 2010-208887 can be appropriately used to produce the mesoporous material 21.

The mesoporous material 21 prepared by such a method has a structure in which the pore volume of the mesopores is large and the mesopores communicate with each other. Thus, the catalyst metal particles 22 are likely to be supported in the mesopores and a reaction gas is likely to be supplied to the supported catalyst metal particles 22. After synthesis, a crushing treatment may be performed for the purpose of adjusting the average particle size of the mesoporous material 21. A wet bead mill, a dry bead mill, a wet ball mill, a dry ball mill, a wet jet mill, a dry jet mill, and the like can be given as examples of a crushing apparatus. In particular, it is appropriate that the wet bead mill is used because the mesoporous material 21 is likely to be crushed to a fine particle size.

Catalyst Metal Particles

The catalyst metal particles 22 supported in at least an inner portion of the mesoporous material 21 according to an embodiment of the present disclosure contain platinum and a metal different from platinum. Examples of the metal different from platinum include cobalt, nickel, manganese, titanium, aluminum, chromium, iron, molybdenum, tungsten, ruthenium, palladium, rhodium, iridium, osmium, copper, silver, and the like. In particular, an alloy of platinum and cobalt has high catalytic activity for an oxygen reduction reaction and good durability in an environment in which a fuel cell generates electricity and is therefore appropriate.

Water-Repellent Material

In general, an electrode catalyst layer containing carbon particles with an average particle size of 10 nm to 100 nm has high water repellency due to capillary force. However, since the average particle size of the mesoporous material 21, which is used in the electrode catalyst layers 12 according to an embodiment of the present disclosure, is greater than or equal to 200 nm, a problem with drainage performance occurs in some cases. Therefore, at least one of carbon black or carbon nanotubes may be added to the electrode catalyst layers 12 in the form of a water-repellent material. This configuration enables the drainage performance of the electrode catalyst layers 12 to be enhanced. Therefore, in a case where the membrane-electrode assembly 10 according to an embodiment of the present disclosure is used in a fuel cell, the power generation performance of the fuel cell can be enhanced.

Ketjenblack, acetylene black, Vulcan, Black Pearls, and the like are given as examples of carbon black. Examples of the carbon nanotubes include single-walled carbon nanotubes, multi-walled carbon nanotubes, and the like. In particular, Ketjenblack is appropriate because Ketjenblack can form effective drainage paths in the electrode catalyst layers 12 even in a small addition amount since aggregates are linearly developed.

Ionomer

The ionomer 30 (proton-conductive resin) according to an embodiment of the present disclosure may be an ion-exchange resin. In particular, a perfluorosulfonic acid resin is appropriate because the perfluorosulfonic acid resin has high proton conductivity and is stably present in an environment in which a fuel cell generates electricity. The ion-exchange capacity of the ion-exchange resin may be greater than or equal to 0.9 milliequivalents/g-dry resin and less than or equal to 2.0 milliequivalents/g-dry resin. When the ion-exchange capacity is greater than or equal to 0.9 milliequivalents/g-dry resin, high proton conductivity is likely to be obtained. When the ion-exchange capacity is less than or equal to 2.0 milliequivalents/g-dry resin, the swelling of resin due to water absorption is suppressed and the diffusion of gas in the electrode catalyst layers 12 is unlikely to be inhibited. It is appropriate that the ratio of the weight of the ionomer 30 to the sum of the weights of the mesoporous material 21 and water-repellent material 31 contained in the electrode catalyst layers 12 is 0.2 to 2.0.

EXAMPLES

A method for synthesizing an electrode catalyst (hereinafter abbreviated as a catalyst in some cases) used in each of Examples 1 and 2 according to the present disclosure and Comparative Examples 1 to 3 is described below.

Synthesis of Catalyst

Example 1

A mesoporous material used was commercially available mesoporous carbon (CNovel produced by Toyo Tanso Co., Ltd.) having a design pore size of 10 nm. The mesoporous carbon was added to a mixed solvent containing equal amounts of water and ethanol, whereby slurry with a solid concentration of 1 wt % was prepared. Zirconia beads with a diameter of 0.5 mm were added to the slurry, followed by a crushing treatment for 20 minutes under conditions including a peripheral velocity of 12 m/s using a medium agitation-type wet bead mill (LAB STAR Mini, manufactured by Ashizawa Finetech Ltd.). After the crushing treatment, the zirconia beads were taken out of the slurry. After the solvent was evaporated, obtained aggregates were ground in a mortar, whereby a carbon support (mesoporous material 21) was prepared.

To 400 mL of a mixed solvent with a water-to-ethanol ratio of 1:1 (weight ratio), 1 g of the obtained carbon support was added, followed by ultrasonic dispersion for 15 minutes. After dispersion, a 14 wt % nitric acid solution of dinitrodiamine platinum was added dropwise under stirring in a nitrogen atmosphere such that platinum accounted for wt % of the carbon support, followed by heating and stirring at 80° C. for six hours. After natural cooling, filtration and washing were performed, followed by drying at 80° C. for 15 hours. Obtained aggregates were ground in a mortar, followed by a heat treatment at 220° C. for two hours in an atmosphere with a nitrogen-to-hydrogen ratio of 85:15, whereby platinum-supported mesoporous carbon (hereinafter referred to as Pt/MPC) was prepared.

To a conical beaker, 0.3 g of obtained Pt/MPC was added. The conical beaker was allowed to stand at 30° C./90% RH (relative humidity) for 12 hours, whereby water vapor was adsorbed on Pt/MPC (water vapor adsorption treatment step).

Furthermore, 30 mL of an aqueous solution in which an amount of cobalt chloride hexahydrate was dissolved in pure water such that the molar ratio of cobalt to the sum of platinum and cobalt was 0.48 was added to the conical beaker containing Pt/MPC. After an ultrasonic dispersion treatment was performed for 15 minutes, 30 mL of a 1 wt % aqueous solution of sodium borohydride was slowly added dropwise to the conical beaker, followed by stirring at room temperature for ten minutes, whereby cobalt was reduced. This was filtered, was washed, and was dried at 80° C. for 15 hours. After obtained powder was ground in a mortar, the powder was sealed in an alumina crucible and was heat-treated in a reducing atmosphere. Specifically, the alumina crucible containing the powder was introduced into a Tammann tube-type atmospheric electric furnace (S6T-2035D, manufactured by Motoyama Co., Ltd.), was first heated from room temperature to 120° C. over ten minutes, and was then maintained at this temperature for 60 minutes. Thereafter, the alumina crucible was heated to 1,000° C. at a rate of 150° C./h and was maintained at this temperature for 30 minutes. The alumina crucible was heated to 1,100° C. at a rate of 100° C./h and was maintained at this temperature for two hours. Thereafter, the alumina crucible was cooled to 1,000° C. at a rate of 100° C./h and was maintained at this temperature for 30 minutes. The alumina crucible was cooled to room temperature at a rate of 150° C./h. During that period, a nitrogen-hydrogen mixture gas with a nitrogen-to-hydrogen ratio of 97:3 was fed through a tube at a flow rate of 1 L/min, whereby a reducing atmosphere was maintained. Furthermore, the obtained powder was stirred in 100 mL of a 0.2 mol/L aqueous solution of sulfuric acid at 80° C. for two hours. After filtration and washing, the powder was subsequently stirred in 100 mL of a 0.2 mol/L aqueous solution of nitric acid at 70° C. for two hours, whereby excess cobalt on a top surface was dissolved in advance. This was filtered, was washed, and was dried at 80° C. for 15 hours and obtained powder was ground in a mortar, whereby platinum-cobalt alloy-supported mesoporous carbon (hereinafter referred to as PtCo/MPC) was prepared as a catalyst of Example 1.

Example 2

A catalyst (PtCo/MPC) of Example 2 was prepared similarly to the catalyst of Example 1 except heat treatment conditions for alloying.

Specifically, in a heat treatment for alloying, an alumina crucible containing the powder prepared in Example 1 was first heated from room temperature to 120° C. over ten minutes and was then maintained at this temperature for 60 minutes. Thereafter, the alumina crucible was heated to 1,000° C. at a rate of 150° C./h and was maintained at this temperature for 30 minutes. The alumina crucible was heated to 1,100° C. at a rate of 100° C./h and was maintained at this temperature for 30 minutes. Thereafter, the alumina crucible was cooled to 1,000° C. at a rate of 100° C./h and was maintained at this temperature for 30 minutes. The alumina crucible was cooled to room temperature at a rate of 150° C./h.

Comparative Example 1

A catalyst (PtCo/MPC) of Comparative Example 1 was prepared similarly to the catalyst of Example 1 except the amount of cobalt chloride hexahydrate and heat treatment conditions for alloying.

Specifically, after water vapor was adsorbed on Pt/MPC, the amount of cobalt chloride hexahydrate was adjusted such that the molar ratio of cobalt to the sum of platinum and cobalt added to a conical beaker containing Pt/MPC was 0.28. In a heat treatment for alloying, an alumina crucible containing Pt/MPC and cobalt chloride hexahydrate was first heated from room temperature to 120° C. over ten minutes and was then maintained at this temperature for 60 minutes. Thereafter, the alumina crucible was heated to 700° C. at a rate of 150° C./h and was maintained at this temperature for 30 minutes. The alumina crucible was heated to 800° C. at a rate of 100° C./min and was maintained at this temperature for 30 minutes. Thereafter, the alumina crucible was cooled to 700° C. at a rate of 100° C./h and was maintained at this temperature for 30 minutes. The alumina crucible was cooled to room temperature at a rate of 150° C./min.

Comparative Example 2

A catalyst (PtCo/MPC) of Comparative Example 2 was prepared similarly to the catalyst of Comparative Example 1 except heat treatment conditions for alloying.

Specifically, in a heat treatment for alloying, an alumina crucible containing Pt/MPC and cobalt chloride hexahydrate was first heated from room temperature to 120° C. over ten minutes and was then maintained at this temperature for 60 minutes. Thereafter, the alumina crucible was heated to 800° C. at a rate of 150° C./h and was maintained at this temperature for 30 minutes. The alumina crucible was heated to 900° C. at a rate of 100° C./min and was maintained at this temperature for 30 minutes. Thereafter, the alumina crucible was cooled to 800° C. at a rate of 100° C./h and was maintained at this temperature for 30 minutes. The alumina crucible was cooled to room temperature at a rate of 150° C./min.

Comparative Example 3

A catalyst of Comparative Example 3 was prepared similarly to the catalyst of Comparative Example 2 except carbon black used as a support.

Specifically, a commercially available platinum-supported carbon black catalyst (TEC 10E50E, produced by Tanaka Kikinzoku Kogyo K. K.) was used instead of Pt/MPC subjected to a water vapor adsorption treatment. In a heat treatment for alloying, an alumina crucible containing the platinum-supported carbon black catalyst and cobalt chloride hexahydrate was first heated from room temperature to 120° C. over ten minutes and was then maintained at this temperature for 60 minutes. Thereafter, the alumina crucible was heated to 800° C. at a rate of 150° C./h and was maintained at this temperature for 30 minutes. The alumina crucible was heated to 900° C. at a rate of 100° C./min and was maintained at this temperature for 30 minutes. Thereafter, the alumina crucible was cooled to 800° C. at a rate of 100° C./h and was maintained at this temperature for 30 minutes. The alumina crucible was cooled to room temperature at a rate of 150° C./min.

Comparative Example 4

A catalyst of Comparative Example 4 was prepared similarly to the catalyst of Example 1 except carbon black used as a support.

Specifically, a commercially available platinum-supported carbon black catalyst (TEC 10E50E, produced by Tanaka Kikinzoku Kogyo K. K.) was used instead of Pt/MPC subjected to a water vapor adsorption treatment. In a heat treatment for alloying, an alumina crucible containing the platinum-supported carbon black catalyst and cobalt chloride hexahydrate was first heated from room temperature to 120° C. over ten minutes and was then maintained at this temperature for 60 minutes. Thereafter, the alumina crucible was heated to 1,000° C. at a rate of 150° C./h and was maintained at this temperature for 30 minutes. The alumina crucible was heated to 1,100° C. at a rate of 100° C./min and was maintained at this temperature for 120 minutes. Thereafter, the alumina crucible was cooled to 1,000° C. at a rate of 100° C./h and was maintained at this temperature for 30 minutes. The alumina crucible was cooled to room temperature at a rate of 150° C./min.

Heat treatment conditions of the catalysts of Examples 1 and 2 and Comparative Examples 1 to 4 were summarized in Table 1 below so as to be readily compared to other examples.

Calculation of Catalyst Loading Rate

The catalyst loading rate of the whole of platinum and cobalt in the catalyst of each of Examples 1 and 2 and Comparative Examples 1 to 4 was determined as described below. First, the catalyst was weighed into a beaker made of quartz and carbon was burnt by heating the beaker in an electric furnace. After natural cooling, small amounts of nitric acid and hydrochloric acid were added to the beaker and the beaker was heated, followed by dilution with pure water. The beaker was introduced into an inductive coupled plasma-atomic emission spectroscopy (ICP-AES) analyzer (CIROS-1200 manufactured by Spectro) and platinum and cobalt were quantitatively analyzed.

Thus, the weight of each of platinum and cobalt in the catalyst was determined. Furthermore, catalyst loading rate was calculated from the ratio of the weight of platinum and cobalt to the total weight of the catalyst.

Calculation of Proportion of $L1_0$ Structure

The proportion of an $L1_0$ structure ($L1_0$ ordered alloy structure) of the catalyst of each of Examples 1 and 2 and Comparative Examples 1 to 3 was determined as described below. X'pert Pro MPD manufactured by Spectris Co., Ltd. was used for X-ray diffraction (XRD) measurement. First, a powder of the catalyst was packed into a sample holder having a frosted concave portion such that a surface of the catalyst powder was flush with the position of a surface of the sample holder, and then the sample holder was set to an instrument. Incident light was Cu Kα, a detector used was a one-dimensional semiconductor detector, and 2θ-θ measurement was performed in the range of 2θ=10° to 90° in a focusing beam optical system. FIG. 3 shows XRD patterns of the catalysts of Examples 1 and 2 and Comparative Examples 1 to 4.

Figure 4:
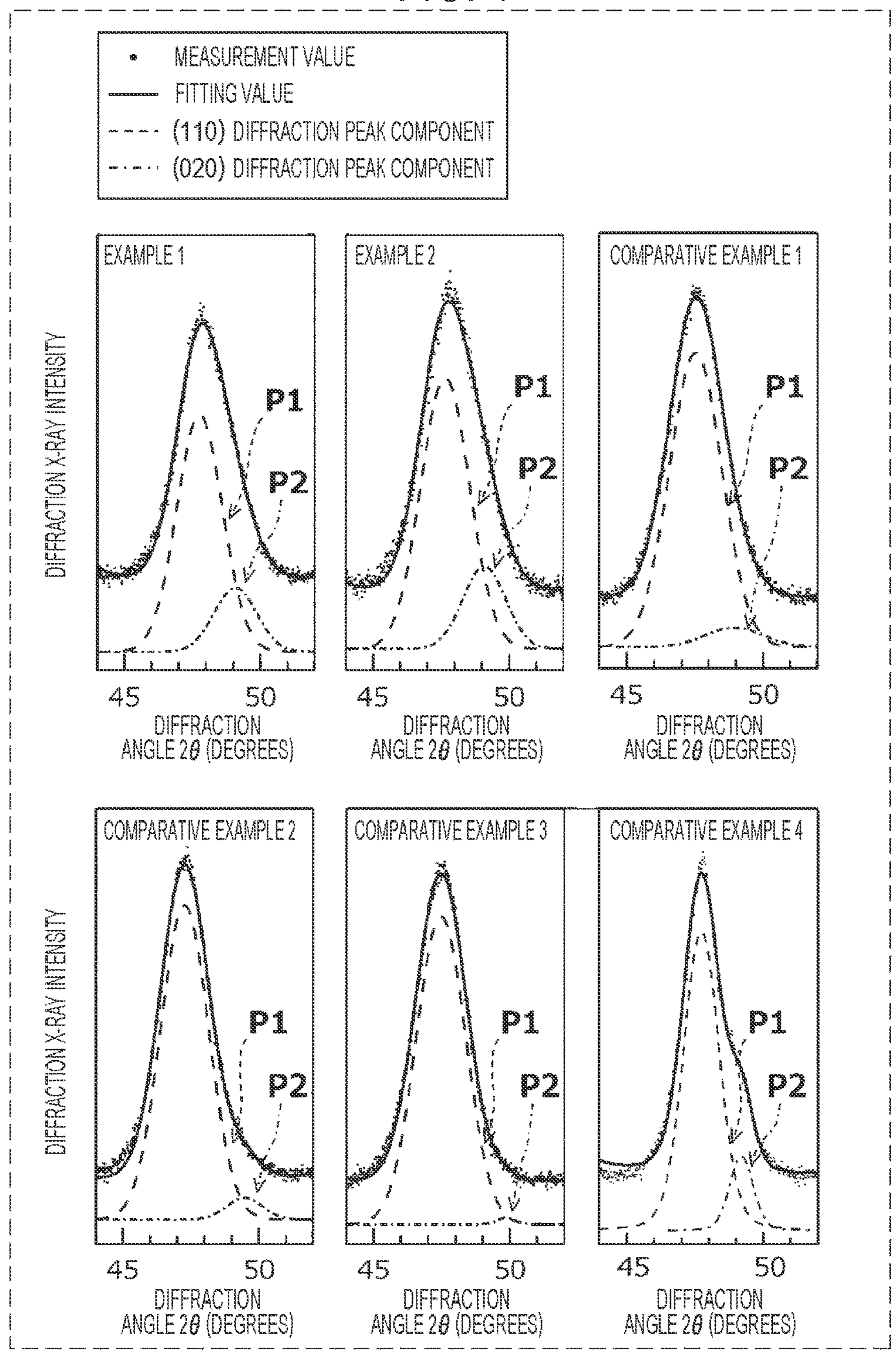
FIG. 4 is a graph showing XRD patterns of electrode catalysts according to Examples 1 and 2 and Comparative Examples 1 to 4, fitting values thereof, (110) diffraction peak components at the fitting values, and (020) diffraction peak components at the fitting values.

The obtained XRD patterns were fitted by a procedure below using HighScore Plus which was analysis software attached to the instrument. First, a background of data was determined using a cubic spline curve and was subtracted. Next, a data curve from which the background was removed was subjected to multi-peak fitting over the above-mentioned angle range. On this occasion, a symmetrical pseudo-Voigt function was used as each peak shape. In particular, a data curve in the range of 2θ=45° to 50° was regarded as an overlap of two peaks. Supposing the two peaks, that is, the area of a peak that corresponds to the (110) diffraction of an $L1_0$ structure on the low angle side and the area of a peak that corresponds to the (020) diffraction thereof are $S_1$ and $S_2$, respectively, the proportion R of the $L1_0$ structure is given by the following equation:

$$R = \frac{1 + S_{01}/S_{02}}{1 + S_1/S_2} = \frac{1 + 2.06}{1 + S_1/S_2} = \frac{3.06}{1 + S_1/S_2} \quad (1)$$

where $S_{01}$ and $S_{02}$ are the theoretical intensity of a (110) diffraction peak of the $L1_0$ structure and the theoretical intensity of a (020) diffraction peak thereof, respectively. The ratio $S_{01}/S_{02}$ is 2.06 in accordance with diffraction intensity simulation. That is, $S_1/S_2$ in Equation (1) does not theoretically fall below 2.06 and therefore the proportion R of the $L1_0$ structure of Equation (1) takes an appropriate value less than or equal to 1 depending on the state of the $L1_0$ structure of the catalyst FIG. 4 shows XRD pattern measurement values (dots) in the range of 45° to 50°, fitting values (continuous lines), components of (110) diffraction peaks P1 (dotted lines) at the fitting values, and components of (020) diffraction peaks P2 (long dashed short dashed lines) when XRD patterns measured in Examples 1 and 2 and Comparative Examples 1 to 4 are subjected to the above-mentioned multi-peak fitting. That is, $S_1$ in Equation (1) corresponds to the integral of counts of a vertical axis of each (110) diffraction peak Pb. $S_2$ in Equation (1) corresponds to the integral of counts of a vertical axis of each (020) diffraction peak P2. In FIG. 4, the (110) diffraction peaks P1 and the (020) diffraction peaks P2 are shown in such a manner that the (110) diffraction peaks P1 and the (020) diffraction peaks P2 are displaced downward overall because if these peaks are shown as they are, these peaks overlap fitting values and are indistinguishable.

Evaluation of Catalytic Activity

In order to evaluate the performance of each of the catalysts of Examples 1 and 2 and the catalysts of Comparative Examples 1 to 4, fuel cell single-cells including electrode catalyst layers 12 containing these catalysts were prepared as described below.

First, catalyst layers of air electrodes of Examples 1 and 2 and Comparative Examples 1 and 2 were prepared by a procedure below. The catalyst of each of Examples 1 and 2 and Comparative Examples 1 and 2 and a weight of Ketjenblack (EC 300J produced by Lion Specialty Chemicals Co., Ltd.) that was one-half the weight of mesoporous carbon contained in the catalyst were added to a mixed solvent containing equal amounts of water and ethanol, followed by stirring. An ionomer (Nafion produced by DuPont Inc.) was added to obtained slurry such that the weight ratio of the ionomer to total carbon (mesoporous carbon+Ketjenblack) was 1.2, followed by a dispersion treatment. A catalyst ink obtained in this manner was applied to a polymer electrolyte membrane 11 (Nafion membrane produced by DuPont Inc.) by a spraying method, whereby a catalyst layer of an air electrode was prepared.

On the other hand, catalyst layers of air electrodes of Comparative Examples 3 and 4 were prepared by a procedure below. The catalyst of each of Comparative Examples 3 and 4 was added to a mixed solvent containing equal amounts of water and ethanol, followed by stirring. An ionomer (Nafion produced by DuPont Inc.) was added to obtained slurry such that the weight ratio of the ionomer to a carbon support was 0.8, followed by a dispersion treatment. A catalyst ink obtained in this manner was applied to a polymer electrolyte membrane 11 (Nafion membrane produced by DuPont Inc.) by a spraying method, whereby a catalyst layer of an air electrode was prepared.

Subsequently, catalyst layers of fuel electrodes were formed by a procedure below. The catalyst layers of the fuel electrodes were the same in Examples 1 and 2 and Comparative Examples 1 to 4.

First, a commercially available platinum-supported carbon black catalyst (TEC 10E50E produced by Tanaka Kikinzoku Kogyo K. K.) was added to a mixed solvent containing equal amounts of water and ethanol, followed by stirring. An ionomer (Nafion produced by DuPont Inc.) was added to obtained slurry such that the weight ratio of the ionomer to a carbon support was 0.8, followed by an ultrasonic dispersion treatment. A catalyst ink obtained in this manner was applied by a spraying method to a principal surface of a polymer electrolyte membrane 11 which is opposite to a principal surface on which the catalyst layer of the air electrode was formed, whereby a catalyst layer of a fuel electrode was prepared.

A gas diffusion layer 13 (GDL 25BC manufactured by SGL Carbon Japan Ltd.) was placed on each of the catalyst layers of the air electrodes and the catalyst layers of the fuel electrodes of Examples 1 and 2 and Comparative Examples 1 to 4 and a pressure of 7 kgf/cm 2 was applied to the gas diffusion layer 13 at a high temperature of 140° C. for five minutes, whereby membrane-electrode assemblies 10 were prepared.

Each of the obtained membrane-electrode assemblies was interposed between separators provided with a channel with a serpentine shape and was incorporated into a predetermined jig, whereby a fuel cell single-cell was prepared.

The temperature of the obtained fuel cell single-cell was maintained at 65° C., hydrogen with a dew point of 65° C. was fed to a fuel electrode side at a flow rate corresponding to a utilization factor of 70%, and air with a dew point of 65° C. was fed to an air electrode side at a flow rate corresponding to an oxygen utilization factor of 40%. For the fuel cell single-cell, the voltage of a fuel cell was measured in a constant current operation using an electronic loading device (PLZ-664WA manufactured by Kikusui Electronics Corp.). During measurement, the electrical resistance of the fuel cell was measured in-situ using a low-resistance meter having a fixed frequency of 1 kHz. The current at 0.9 V was read from a current-voltage curve corrected with the electrical resistance of the fuel cell and was normalized with the amount of platinum contained in an electrode catalyst layer of an air electrode, whereby an indicator for catalytic activity was determined. This is called mass activity (A/g-Pt) at 0.9 V and is generally used as an indicator showing the catalytic activity of a fuel cell.

For the catalysts of Examples 1 and 2 and Comparative Examples 1 to 4 that were prepared as described above, production methods and physical properties were summarized in Table 1 below.

TABLE 1

| | | Example 1 | Example 2 | Comparative Example 1 | Comparative Example 2 | Comparative Example 3 | Comparative Example 4 |
|---|---|---|---|---|---|---|---|
| Before alloying | | Pt/MPC | Pt/MPC | Pt/MPC | Pt/MPC | Pt/KB | Pt/KB |
| Charge Co molar ratio | | 0.48 | 0.48 | 0.28 | 0.28 | 0.28 | 0.48 |
| Heat Treatment Program 1 | Initial temperature | Room temperature | Room temperature | Room temperature | Room temperature | Room temperature | Room temperature |
| | Rate | 10 minutes | 10 minutes | 10 minutes | 10 minutes | 10 minutes | 10 minutes |
| | Temperature | 120° C. | 120° C. | 120° C. | 120° C. | 120° C. | 120° C. |
| | Holding time | 60 minutes | 60 minutes | 60 minutes | 60 minutes | 60 minutes | 60 minutes |
| Heat Treatment Program 2 | Rate | 150° C./hour | 150° C./hour | 150° C./hour | 150° C./hour | 150° C./hour | 150° C./hour |
| | First temperature | 1000° C. | 1000° C. | 700° C. | 800° C. | 800° C. | 1000° C. |
| | Holding time | 30 minutes | 30 minutes | 30 minutes | 30 minutes | 30 minutes | 30 minutes |
| Heat Treatment Program 3 | Rate | 100° C./hour | 100° C./hour | 100° C./hour | 100° C./hour | 100° C./hour | 100° C./hour |
| | Second temperature | 1100° C. | 1100° C. | 800° C. | 900° C. | 900° C. | 1100° C. |
| | Holding time | 120 minutes | 30 minutes | 30 minutes | 30 minutes | 30 minutes | 120 minutes |
| Heat Treatment Program 4 | Rate | 100° C./hour | 100° C./hour | 100° C./hour | 100° C./hour | 100° C./hour | 100° C./hour |
| | Third temperature | 1000° C. | 1000° C. | 700° C. | 800° C. | 800° C. | 1000° C. |
| | Holding time | 30 minutes | 30 minutes | 30 minutes | 30 minutes | 30 minutes | 30 minutes |
| Heat Treatment Program 5 | Rate | 150° C./hour | 150° C./hour | 150° C./hour | 150° C./hour | 150° C./hour | 150° C./hour |
| | Temperature | Room temperature | Room temperature | Room temperature | Room temperature | Room temperature | Room temperature |
| | Holding time | 0 minutes | 0 minutes | 0 minutes | 0 minutes | 0 minutes | 0 minutes |
| Catalyst loading rate ((Pt + Co)wt %) | | 46.3 | 48.4 | 47.5 | 50.0 | 51.8 | 51.6 |
| $L1_0$ proportion | | 0.61 | 0.65 | 0.15 | 0.20 | 0.02 | 0.52 |
| Catalytic activity (A/g-Pt) | | 478 | 476 | 144 | 192 | 189 | 269 |

Table 1 is a table in which a production method (production conditions), physical properties, and catalytic activity are summarized for each of the catalysts of Examples 1 and 2 and Comparative Examples 1 to 4. That is, in Table 1, for each of Examples 1 and 2 and Comparative Examples 1 to 4 listed in rows in a horizontal direction, items such as the type of a catalyst before alloying, the molar ratio of charged cobalt to the sum of platinum and cobalt, and Heat Treatment Programs 1 to 5 which are examples of heat treatment conditions of the catalysts are listed in columns in a vertical direction. Heat Treatment Programs 1 to 5 are continuously carried out.

In Heat Treatment Program 1, the time (ten minutes) corresponding to a rate for heating a catalyst from an initial temperature (room temperature) to 120° C. and a holding time (60 minutes) for which the catalyst was maintained at 120° C. are shown. Conditions of Heat Treatment Program 1 are the same in Examples 1 and 2 and Comparative Examples 1 to 4.

In Heat Treatment Program 2, a rate (° C./h) for heating a catalyst from the above temperature (120° C.) to a first temperature that is higher than this temperature and a holding time (minutes) for which the catalyst was maintained at the first temperature are shown. For example, for Example 1, in Heat Treatment Program 2, the catalyst was heated from 120° C. to 1,000° C. at a heating rate of 150° C./h and was maintained for 30 minutes in such a state that the temperature of the catalyst was 1,000° C.

In Heat Treatment Program 3, a rate (° C./h) for heating a catalyst from the first temperature to a second temperature that is higher than the first temperature and a holding time (minutes) for which the catalyst was maintained at the second temperature are shown. For example, for Example 1, in Heat Treatment Program 3, the catalyst was heated from 1,000° C. to 1,100° C. at a heating rate of 100° C./h and was maintained for 120 minutes in such a state that the temperature of the catalyst was 1,100° C.

In Heat Treatment Program 4, a rate (° C./h) for cooling a catalyst from the second temperature to a third temperature and a holding time (minutes) for which the catalyst was maintained at the third temperature are shown. For all of Examples 1 and 2 and Comparative Examples 1 to 4, in Heat Treatment Program 4 of this example, the third temperature was set to the same as the first temperature of Heat Treatment Program 2 and the holding time was set to the same as the holding time of Heat Treatment Program 2. For example, for Example 1, in Heat Treatment Program 4, the catalyst was cooled from 1,100° C. to 1,000° C. at a cooling rate of 100° C./h and was maintained for 30 minutes in such a state that the temperature of the catalyst was 1,000° C. Thereafter, Heat Treatment Program 5 below was carried out.

In Heat Treatment Program 5, a rate (° C./h) for cooling a catalyst from the first temperature to room temperature is shown. In all of Examples 1 and 2 and Comparative Examples 1 to 4, a holding time for which the catalyst was maintained at room temperature was zero. For example, for Example 1, in Heat Treatment Program 5, the catalyst was cooled from 1,000° C. to room temperature at a cooling rate of 150° C./h. Thus, the heat treatment of the catalyst of Example 1 was finished.

Furthermore, in Table 1, for each of Examples 1 and 2 and Comparative Examples 1 to 4 listed in rows in a horizontal direction, physical properties and power generation performance are shown with items such as the combined catalyst loading rate of platinum and cobalt, the proportion of an $L1_0$ structure, and catalytic activity in columns in a vertical direction.

First, the difference in proportion of an $L1_0$ structure due to differences in carbon support and heat treatment conditions were investigated by comparing Comparative Example 1 and Comparative Example 2 with Comparative Example 3. As shown in Table 1, in Comparative Example 3 in which a carbon support used was Ketjenblack (KB), the proportion of the $L1_0$ structure was 0.02. On the other hand, in Comparative Example 1 in which a carbon support used was mesoporous carbon (MPC), the proportion of the $L1_0$ structure was 0.15. In Comparative Example 2 in which the maximum temperature was higher than that of Comparative Example 1, the proportion of the $L1_0$ structure was 0.20. This probably reflects that cobalt diffused to reach an energetically stable atomic site and an alloy phase with the $L1_0$ structure, which is thermodynamically stabler, was formed because the total historical time of heat treatments was sufficiently long in addition to the prevention of aggregation of catalyst metal particles by the use of mesoporous carbon, which is larger in pore volume than Ketjenblack and in which the catalyst metal particles can be highly dispersed and supported. However, the catalytic activity of a fuel cell in which the catalyst of Comparative Example 1 or 2 was used as a catalyst of an air electrode was substantially equal to that of Comparative Example 3 in which substantially no $L1_0$ structure was formed.

As shown in Table 1, charged cobalt molar ratio is equal and catalyst loading rate is substantially equal between Comparative Examples 1 to 3. Since catalytic activity was substantially equal even though a clear difference in the proportion of the $L1_0$ structure was caused by varying the total historical time of a heat treatment, it can be said that catalytic activity is not greatly affected in the range of the proportion of the $L1_0$ structure of these catalysts.

Next, Examples 1 and 2 are investigated in comparison with Comparative Examples 1 to 3. In Examples 1 and 2, the maximum temperature of a heat treatment was 1,100° C. In Example 2, the holding time at the maximum temperature was 30 minutes. On the other hand, in Example 1, the holding time at the maximum temperature was 120 minutes (two hours). Herein, comparing XRD patterns of the catalysts of Examples 1 and 2 with those of Comparative Examples 1 to 3 show that, as shown in FIG. 4, a peak at about 45° to 50° in each of Examples 1 and 2 has an asymmetrical shape with a shoulder on the high angle side, whereas that in Comparative Example 2 has substantially a symmetrical shape. This corresponds to the fact that, although only one peak appears in a disordered phase in the above-mentioned angle range, another new diffraction peak due to a long-range ordered structure in association with the formation of the $L1_0$ structure is formed in the $L1_0$ structure. Performing peak decomposition by peak fitting and determining the proportion of the $L1_0$ structure in accordance with Equation (1) resulted in that the proportion of the $L1_0$ structure was 0.61 in Example 1 and 0.65 in Comparative Example 2, whereas 0.15 in Comparative Example 1, 0.20 in Comparative Example 2, and 0.02 in Comparative Example 3. Thus, it was confirmed that Examples 1 and 2 surely had a larger proportion of the $L1_0$ structure as compared to Comparative Examples 1 to 3. As shown in Table 1, the catalytic activity of a fuel cell single-cell (hereinafter simply referred to as catalytic activity in some cases) in which the catalyst of each of Examples 1 and 2 was used as a catalyst of an air electrode improved significantly as compared to the catalytic activity of a fuel cell single-cell in which the catalyst of each of Comparative Examples 1 to 3 was used as a catalyst of an air electrode.

Finally, Comparative Example 4 is investigated in comparison with Comparative Examples 1 to 3 and Examples 1 and 2. In Comparative Example 4, the maximum temperature of a heat treatment and the holding time were 1,100° C. and 120 minutes (two hours), respectively, as with Example 1. Herein, in view of an XRD pattern of the catalyst of Comparative Example 4, as shown in FIG. 4, a peak at about 45° to 50° has an asymmetrical shape with a shoulder on the high angle side as with Examples 1 and 2. Performing peak decomposition by peak fitting and determining the proportion of the $L1_0$ structure in accordance with Equation (1) resulted in that the proportion of the $L1_0$ structure was 0.52. Thus, it was confirmed that Comparative Example 4 had a larger proportion of the $L1_0$ structure as compared to Comparative Examples 1 to 3. As shown in Table 1, the catalytic activity of a fuel cell single-cell in which the catalyst of Comparative Example 4 was used as a catalyst of an air electrode was 269 A/g-Pt and improved significantly as compared to the catalytic activity of a fuel cell single-cell in which the catalyst of each of Comparative Examples 1 to 3 was used as a catalyst of an air electrode. However, increments between these were small values as compared to an increment of catalytic activity obtained in Examples 1 and 2.

A reason why the increase of catalytic activity does not agree with the increase in proportion of the $L1_0$ structure as described above is probably that a difference between a carbon support used in Examples 1 and 2 and a carbon support used in Comparative Example 4 is reflected. That is, in Comparative Example 4, since the carbon support used is Ketjenblack, a catalyst metal is reduced in catalytic activity by contact with an ionomer and performance that the $L1_0$ structure inherently has cannot be sufficiently exhibited. On the other hand, in Examples 1 and 2, since the carbon support used is mesoporous carbon, it is conceivable that a catalyst metal is not in contact with any ionomer and performance that the $L1_0$ structure inherently has is exhibited.

Therefore, for Comparative Examples 3 and 4 in which a Ketjenblack support (hereinafter, the KB support) was used as a catalyst support and Comparative Example 2 and Example 1 in which a mesoporous carbon support (hereinafter, the MPC support) was used as a catalyst support, the relationship between catalytic activity and the proportion of the $L1_0$ structure was investigated.

Figure 5:
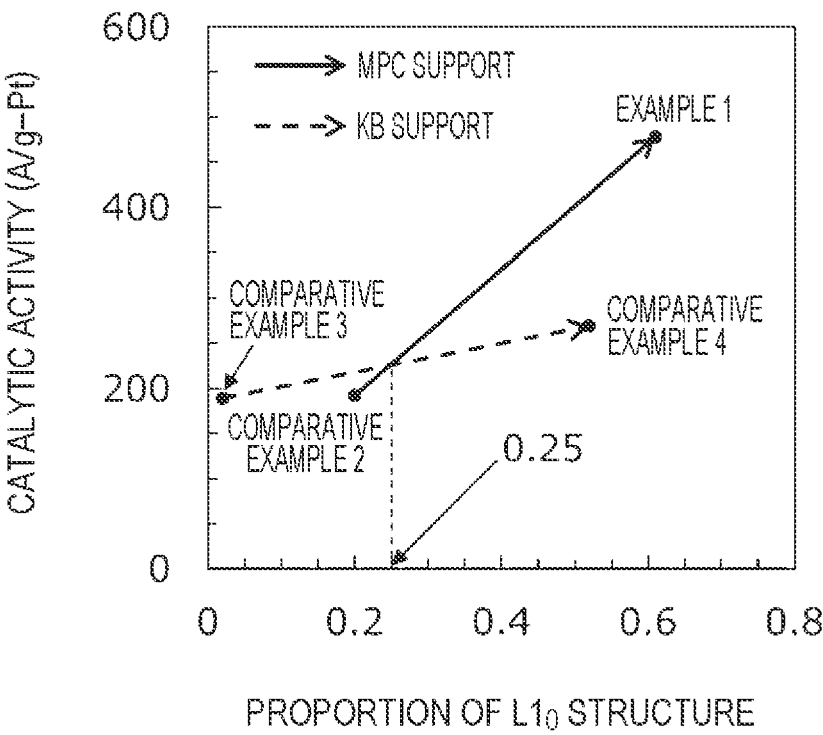
FIG. 5 is a graph showing the relationship between catalytic activity and the proportion of an $L1_0$ structure in each of Example 1 and Comparative Examples 2, 3, and 4.

FIG. 5 illustrates the relationship between catalytic activity and the proportion of the $L1_0$ structure in each of Example 1 and Comparative Examples 2, 3, and 4. In FIG. 5, the horizontal axis represents the proportion of the $L1_0$ structure and the vertical axis represents catalytic activity (A/g-Pt).

As readily understandable from FIG. 5, it is clear that the rate of increase in catalytic activity with respect to the rate of change in proportion of the $L1_0$ structure in a case where the MPC support is used as a catalyst support is greater than the rate of increase in catalytic activity with respect to the rate of change in proportion of the $L1_0$ structure in a case where the KB support is used as a catalyst support. This means that when two factors, the type of a catalyst support and the proportion of the $L1_0$ structure, are involved in the enhancement of catalytic activity, a synergistic effect of these factors is obtained.

Specifically, as shown in FIG. 5, the gradient of a straight line (continuous line) passing through data positions (coordinates) of FIG. 5 in Comparative Example 2 and Example 1 is greater than the gradient of a straight line (dotted line) passing through data positions (coordinates) of FIG. 5 in Comparative Examples 3 and 4. If two factors, the type of a catalyst support and the proportion of the $L1_0$ structure, each exhibit an individual effect only in involvement in the enhancement of catalytic activity, it is conceivable that the gradient of the continuous line and the gradient of the dotted line are substantially equal. In fact, when these factors act simultaneously, the rate of increase in catalytic activity indicated by the continuous line is greater than the rate of increase in catalytic activity indicated by the dotted line as described above.

The proportion of the $L1_0$ structure at a point of intersection of the continuous line and the dotted line was determined to be about 0.25 as shown in FIG. 5. Thus, it is conceivable that a catalytic activity-enhancing effect that the $L1_0$ structure inherently has can be appropriately exhibited by the use of the MPC support as a catalyst support in a range in which the proportion of the $L1_0$ structure is greater than 0.25.

It turned out that the proportion of the $L1_0$ structure could be increased by adjusting the maximum attained temperature to a high temperature in a heat treatment step in a reducing atmosphere when the MPC support was used as a catalyst support as described above. In addition, it turned out that a synergistic effect of catalytic activity enhancement due to two factors, the type of a catalyst support and the proportion of the $L1_0$ structure, was appropriately exhibited by setting the proportion of the $L1_0$ structure to the above range when the MPC support was used as a catalyst support.

Many improvements and other embodiments of the present disclosure are apparent to those skilled in the art in view of the foregoing description. Accordingly, the above description is to be construed as illustrative only and is provided for the purpose of teaching those skilled in the art the best mode of carrying out the present disclosure. Details of the structure and/or function thereof may be substantially modified without departing from the spirit of the present disclosure.

INDUSTRIAL APPLICABILITY

The present disclosure is useful in, for example, electrode catalysts for use in membrane-electrode assemblies included in electrochemical devices such as fuel cells.

What is claimed is:

1. An electrode catalyst comprising:

a mesoporous material; and catalyst metal particles which are supported in at least an inner portion of the mesoporous material and which contain platinum and a metal different from platinum, wherein the mesoporous material has mesopores having a mode radius of greater than or equal to 1 nm and less than or equal to 25 nm and a pore volume of greater than or equal to 1.0 $cm^3/g$ and less than or equal to 3.0 $cm^3/g$, and the catalyst metal particles which are supported have an $L1_0$ structure, and a proportion of the $L1_0$ structure is greater than 0.25.

2. The electrode catalyst according to claim 1, wherein the proportion of the $L1_0$ structure in the catalyst metal particles is greater than or equal to 0.60.

3. The electrode catalyst according to claim 1, wherein the metal different from platinum is cobalt.

4. The electrode catalyst according to claim 1, wherein the mode radius of the mesopores of the mesoporous material is greater than or equal to 3 nm and less than or equal to 6 nm.

5. The electrode catalyst according to claim 1, wherein the mesoporous material is mesoporous carbon.

6. An electrode catalyst layer comprising:

the electrode catalyst according to claim 1; and an ionomer.

7. The electrode catalyst layer according to claim 6, further comprising at least one of carbon black or carbon nanotubes.

8. The electrode catalyst layer according to claim 7, wherein the carbon black is Ketjenblack.

9. A membrane-electrode assembly comprising:

a polymer electrolyte membrane;

a fuel electrode; and an air electrode, the fuel electrode and the air electrode being disposed on respective sides of the polymer electrolyte membrane and including an electrode catalyst layer and a gas diffusion layer, wherein the electrode catalyst layer of at least the air electrode includes the electrode catalyst layer according to claim 6.

10. An electrochemical device comprising the membrane-electrode assembly according to claim 9.

* * * * *